(12) United States Patent
Muddle et al.

(10) Patent No.: US 11,347,885 B2
(45) Date of Patent: May 31, 2022

(54) VERIFIED TEMPLATES

(71) Applicant: Via Science, Inc., Somerville, MA (US)

(72) Inventors: John Christopher Muddle, Barcelona (ES); Jesús Alejandro Cárdenes Cabré, Montreal (CA); Jeremy Taylor, Montreal (CA)

(73) Assignee: Via Science, Inc., Somerville, MA (US)

( * ) Notice: Subject to any disclaimer, the term of this patent is extended or adjusted under 35 U.S.C. 154(b) by 0 days.

(21) Appl. No.: 17/348,164

(22) Filed: Jun. 15, 2021

(65) Prior Publication Data

US 2021/0397732 A1    Dec. 23, 2021

Related U.S. Application Data

(60) Provisional application No. 63/039,488, filed on Jun. 16, 2020.

(51) Int. Cl.
*G06F 21/62* (2013.01)
*H04L 9/32* (2006.01)

(52) U.S. Cl.
CPC ........ *G06F 21/6227* (2013.01); *H04L 9/3236* (2013.01); *H04L 2209/38* (2013.01)

(58) Field of Classification Search
CPC .................. G06F 21/6227; H04L 9/3236; H04L 2209/38
See application file for complete search history.

(56) References Cited

U.S. PATENT DOCUMENTS

| | | | |
|---|---|---|---|
| 10,783,597 B1* | 9/2020 | Li ........................ | G06Q 50/18 |
| 2018/0129955 A1* | 5/2018 | Saxena ................ | H04L 9/3236 |
| 2018/0218176 A1* | 8/2018 | Voorhees ............. | H04L 9/3213 |
| 2019/0318122 A1* | 10/2019 | Hockey .............. | H04W 12/084 |

(Continued)

FOREIGN PATENT DOCUMENTS

WO    2020018939 A1    1/2020

OTHER PUBLICATIONS

International Search Report and Written Opinion issued in International Application No. PCT/US2021-037420, dated Sep. 23, 2021, 12 pages.

(Continued)

*Primary Examiner* — J. Brant Murphy
(74) *Attorney, Agent, or Firm* — Pierce Atwood LLP

(57) ABSTRACT

A computing system that facilitates approval and validation of executable code between parties. A template including executable code and specifying certain operations and functions to be performed on protected data, as well as constraints thereto, may be verified and agreed upon by parties. The verified template and/or a hash of the verified template may be stored on a blockchain. Prior to execution of the code certain parameters within the template may be filled and validated by a system that will execute the code. A contract, which too may be agreed upon and stored on the blockchain, may also include other terms governing the parties. The filled template may also be validated, and compared against a blockchain version of the template, by the parties prior to execution of the code and prior to access being granted to protected data. Such verifications and validations ensure that data is only operated on, using a secure system, within the parameters as agreed upon by the parties.

18 Claims, 10 Drawing Sheets

(56) References Cited

U.S. PATENT DOCUMENTS

| | | | | |
|---|---|---|---|---|
| 2020/0133716 A1* | 4/2020 | Nakamura | ............ | G06F 9/4843 |
| 2020/0136843 A1* | 4/2020 | Chalakudi | ............. | H04L 9/0618 |
| 2020/0167338 A1* | 5/2020 | Brock | ................. | G06F 16/2379 |
| 2020/0184470 A1* | 6/2020 | Singh | .................... | H04L 9/3239 |
| 2020/0334771 A1* | 10/2020 | Li | ......................... | H04L 9/0637 |
| 2021/0273992 A1* | 9/2021 | Kochura | ................. | G06F 40/30 |

OTHER PUBLICATIONS

Wang, et al., "Blockchain-based fair payment smart contract for public cloud storage auditing," Information Sciences, vol. 519, May 2020, pp. 348-362.

* cited by examiner

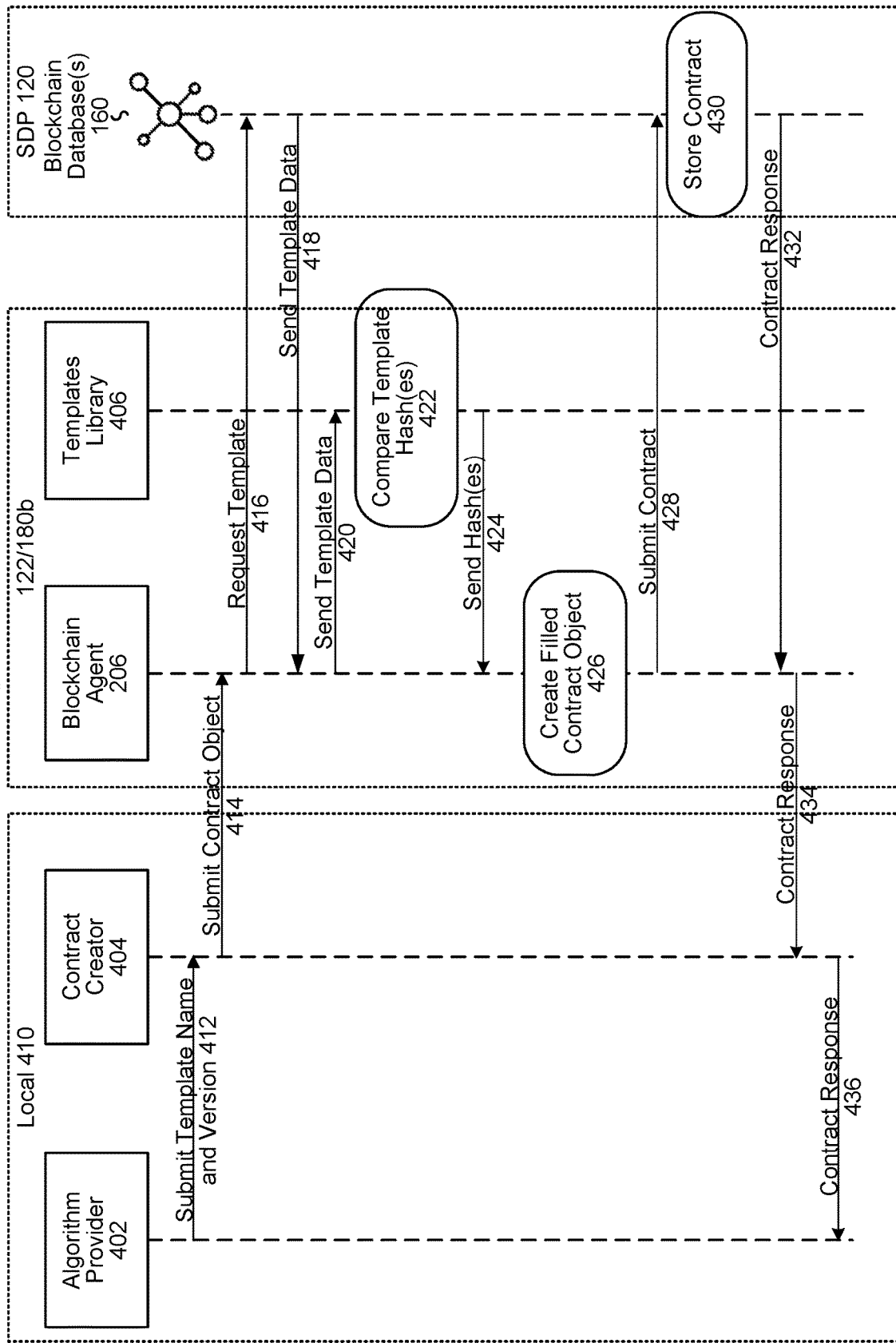

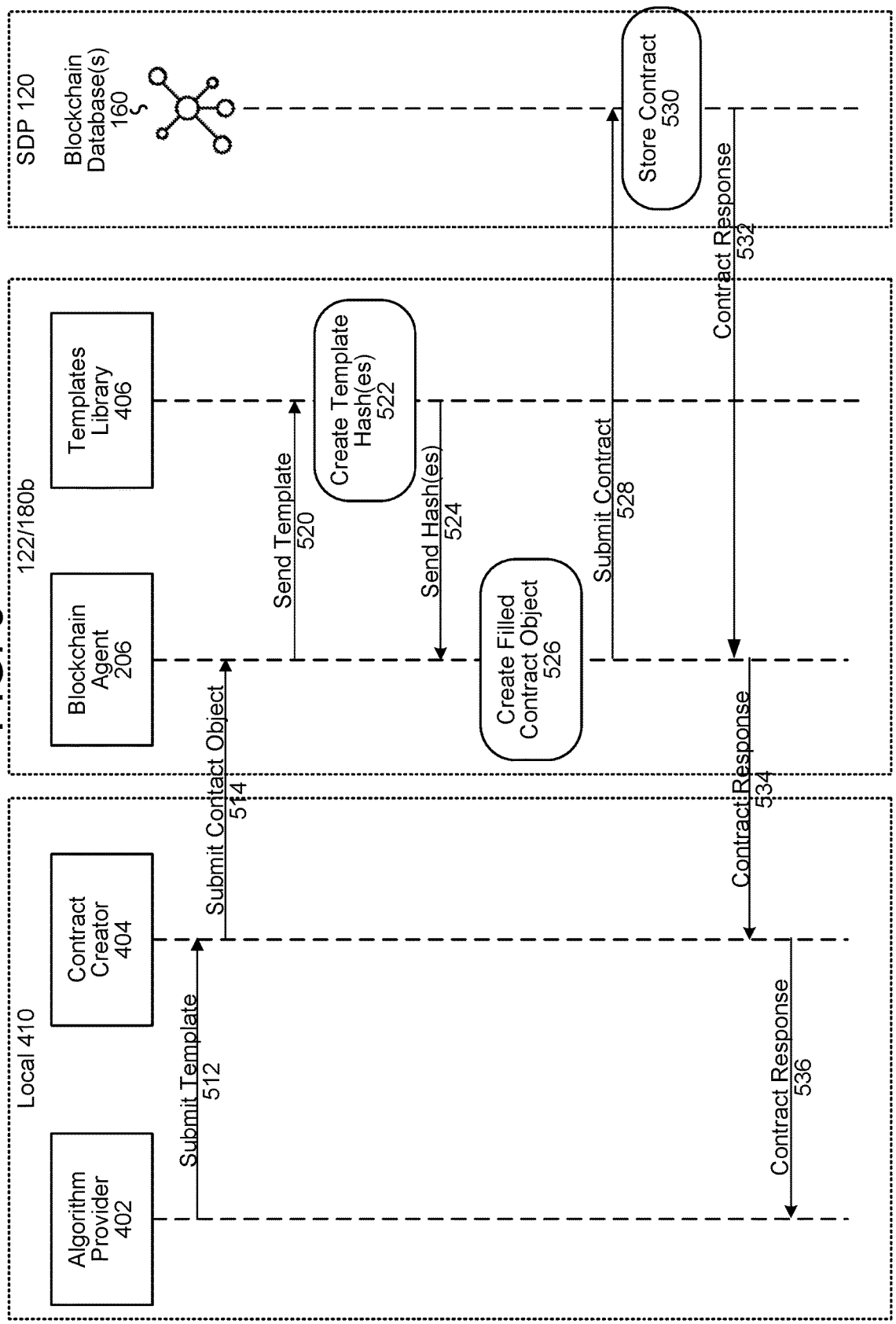

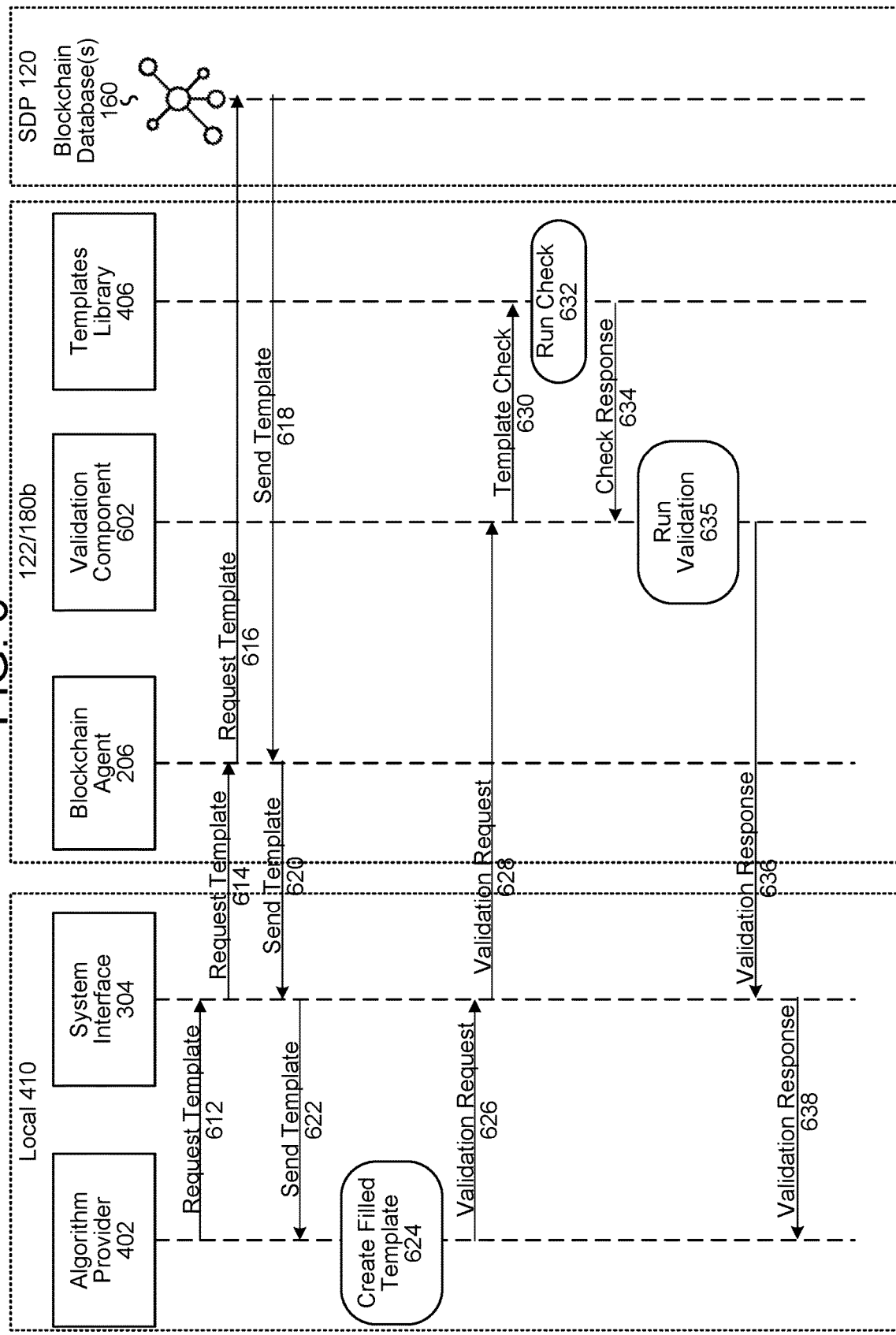

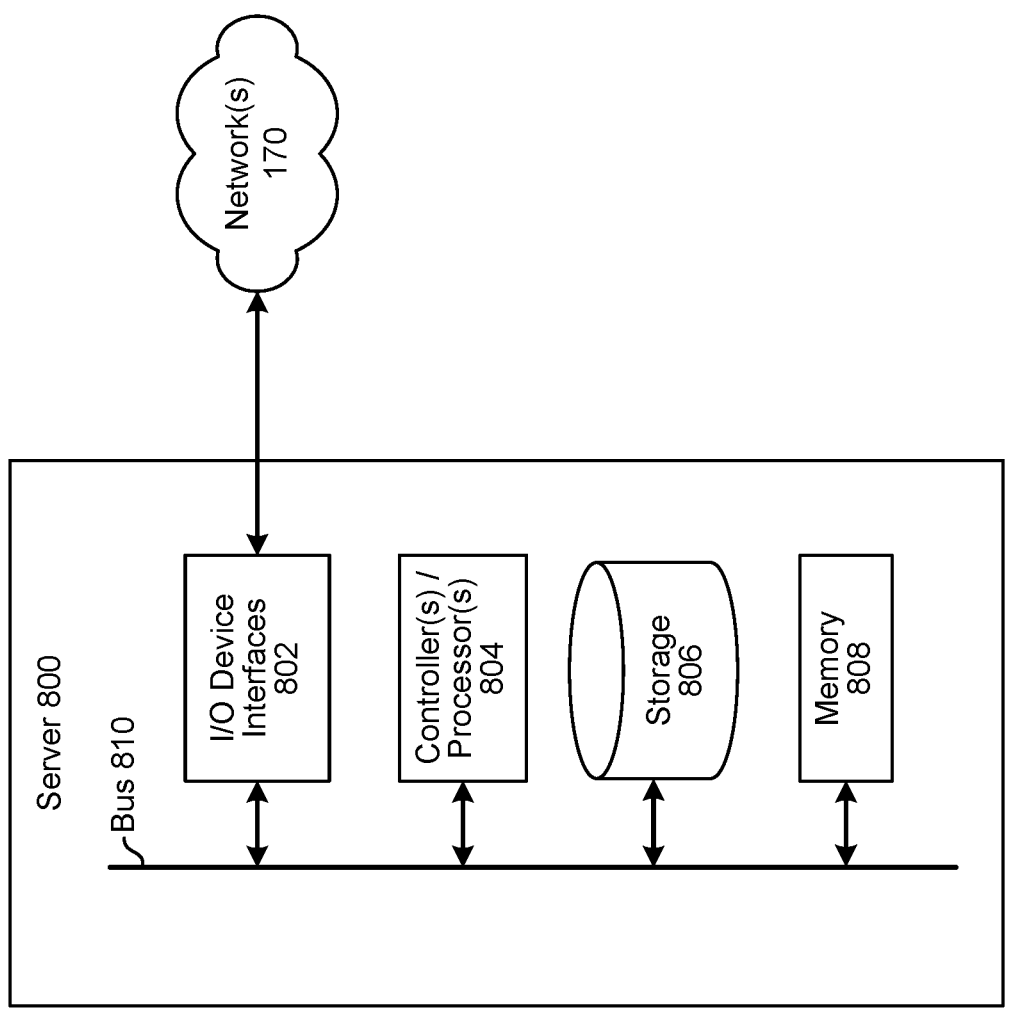

VERIFIED TEMPLATES

CROSS-REFERENCE TO RELATED APPLICATION DATA

This application claims the benefit of and priority to U.S. Provisional Patent Application No. 63/039,488, filed Jun. 16, 2020, and entitled "Verified Templates: Proposal V2," in the name of John Muddle, et al. The above provisional application is herein incorporated by reference in its entirety.

BACKGROUND

Data security and encryption is a branch of computer science that relates to protecting information from disclosure to other systems and allowing only an intended system access to that information. The data may be encrypted using various techniques, such as public/private key cryptography and/or elliptic cryptography, and may be decrypted by the intended recipient using a shared public key and a private key and/or other corresponding decryption technique. Transmission of the data is protected from being decrypted by other systems at least by their lack of possession of the encryption information.

BRIEF DESCRIPTION OF DRAWINGS

For a more complete understanding of the present disclosure, reference is now made to the following description taken in conjunction with the accompanying drawings.

FIG. 4 shows an example of storing a smart contract on the blockchain using a verified template that is first retrieved from the blockchain according to embodiments of the present disclosure.

FIG. 5 shows an example of storing a smart contract on the blockchain using a verified template that is obtained from a non-blockchain source according to embodiments of the present disclosure.

FIG. 6 shows an example of validating the operability of a verified template for use with a secure data processing system according to embodiments of the present disclosure.

FIG. 8 illustrates components of a system according to embodiments of the present disclosure.

SUMMARY

Figure 1:
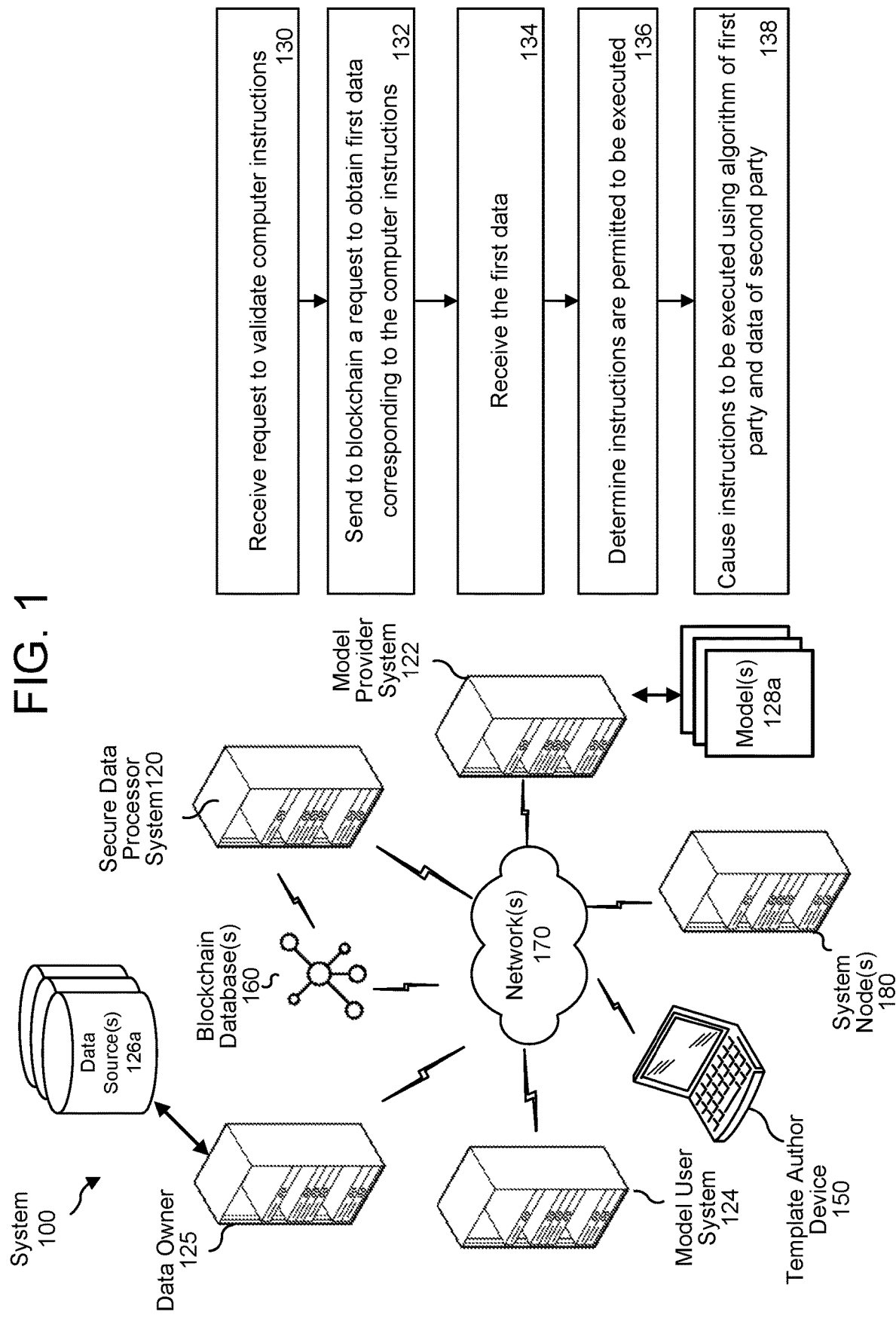
FIG. 1 illustrates a system configured to securely process data according to embodiments of the present disclosure.

A system and method for checking and causing execution of computer executable instructions corresponding to an agreement between parties. A first request is received from a first system. The first request requests validation of executable computer instructions for operation by at least one system other than the first system. A second request is sent by a second system and to at least one device associated with a blockchain. The second request requests first data corresponding to the executable computer instructions, wherein the first data corresponds to an agreement between at least a first party and a second party regarding the executable computer instructions; The first data is received by the second system. It is determined that the executable computer instructions are permitted to be executed by the at least one system other than the first system. The executable computer instructions are caused to be executed, wherein execution of the computer instructions results in operating an algorithm associated with the first party on data associated with the second party.

DETAILED DESCRIPTION

Data may be analyzed for a variety of purposes. Analyzing data may be as simple as applying an algorithm to a set of data and getting some results. When data, the algorithm to be applied to the data, and/or the results thereof are considered sensitive, such as when data includes private or regulated information, or when the algorithm to be performed includes potential trade secrets or protected know-how, coordinating the interactions between data owners, model/algorithm providers, those who wish to perform operations on data, those who wish to view the results of those operations, and other parties can involve significant complications.

In one example, a party may wish to apply a trained machine learning model to a set of data for data analysis but the party such as the data owner may not have the know-how or wherewithal to create such a model while a model provider may not have access to the training data sufficient to create a model or to the underlying data to perform the inference/runtime analysis of the ultimate data operation. Specifically, machine-learning systems, such as those that use neural networks, may be trained using training data and then used to make predictions of events using out-of-sample (i.e., non-training) data. A system providing this data, referred to herein as a data-provider system, may acquire this data from one or more data sources. The data-provider system may be, for example, a power company, and may collect data regarding operational status of a data source such as a particular component (e.g., a transformer); this data may include, for example, temperature, vibration, and/or voltage data collected during use of the component. The data-provider system may then annotate this data to indicate times at which the component failed. Using this collected and annotated data, the data-provider system may train a neural network to predict when the same or similar component will next fail based on the already-known times of past failure. Once trained, the data-provider system may deploy the model to attempt to receive additional data collected from the component and make failure predictions for currently operating components using this out-of-sample data.

As noted above, however, the data-provider system may not have access to sufficient training data, training resources, or other resources required to train a model that is able to predict a given event (e.g., failure of the component) with sufficient accuracy. The data-provider system may thus communicate with another system, such as a model-provider system, that includes such a model. The data-provider system may thus send data regarding the data source(s) to the model-provider system, and the model-provider system may evaluate the model using the data to predict the event. The model of the model-provider system may be trained using data provided by the data-provider system, other data-provider system(s), and/or other sources of data.

The data-provider system may, however, wish to keep the data from the one or more data sources private and, in particular, may not wish to share said data with the model-provider system. The model-provider system may similarly wish to keep the model (and/or one or more trained parameters and/or results thereof, such as threshold data) secret with respect to the data-provider system (and/or other systems). A third system, such as one or more secure processor(s) of a data/model processing system, may thus be used to process data using one or more layers of the model (such as one or more input and/or output layers, as described herein) to thus prevent the data-provider system from being able to learn input data, output data, and/or parameter data associated with the full model.

A system may be configured to allow for secure evaluation of one or more models (which may be the machine-learning model(s) described above, or other models, such as decision trees) using the data such that the data-provider system does not have direct access to the model (and/or results thereof) and such that the model-provider system does not have direct access to the data. A data/model processing system may thus receive encrypted input data from the data-provider system and encrypted threshold data from the model-provider system; the data/model processing system may determine whether an event is predicted to occur by comparing the encrypted input data with the encrypted threshold data.

Similarly, the system may be configured to operate such machine-learning models, or other computer instructions or routines to perform analysis of data in a way that the provider of the underlying algorithm/model/routine is protected from the source of the data to be analyzed. This allows data to be analyzed without one party (e.g., the underlying data in control of a data owner) from disclosing its underlying data to another party (e.g., an algorithm provider). Further, this allows potentially sensitive technical knowhow of the other party (e.g., the models/data operation computer code belonging to the algorithm provider) being disclosed to the original party (e.g., the data owner).

Because of the sensitive nature of the software and/or data being used, not only is it desirable to have a system that shields different parties from sensitive information of others, it is also desirable to have a mechanism for the parties to come to an agreement on the constraints, conditions, etc. surrounding the use of the data and the execution of computer instructions to perform data queries, etc. Particularly in a situation where the parties may have an inherent distrust, or at least wariness, it is desirable to have a process that can record when the parties come to an agreement on how data is to be used, record and maintain that agreement, include within that agreement what operation/operations are to be performed under what conditions, and be able to verify that any proposed execution of a data operation conforms to that agreement prior to its execution. Such a system may be used to ensure that data is only processed in a manner agreed upon by the parties, whether that processing involves a complex machine-learning model or a different or more simple algorithm.

For example, a data owner may desire to set certain conditions on the use of its data, for example setting a number of unique identifiers that may be accessed by a data operation, a maximum percentage that a single unique identifier can contribute to the underlying data, and/or other constraints. As another example, an algorithm provider may desire to construct a deep-learning model while satisfying the restrictions imposed by the data owner. Many different combinations of constraints and operations may be configured to be used within a system of verification and validation as laid out below, thus providing a mechanism for parties who wish to protect their respective information a mechanism for coming to an agreement on data usage in a trusted and computer-verified manner.

FIG. 1 shows a system 100 that includes a secure data processor 120 and a network 170. The network 170 may include the Internet and/or any other wide- or local-area network, and may include wired, wireless, and/or cellular network hardware. The secure data processor system 120 may communicate, via the network 170, with one or more model provider systems 122, model user systems 124, data owner systems 125 and/or other system nodes 180. The secure data processor 120 may also connect to a blockchain database(s) 160 which itself may include a plurality of devices. The blockchain database 160 may exist as part of the secure data processor 120 (which may control access to the blockchain database 160) or the blockchain database may exist as its own entity and be communicable without going through secure data processor 120. The secure data processor 120 may transmit, via the network 170, requests to the other systems using one or more application programming interfaces (APIs)/communication techniques (such as a queue protocol such as advance messaging queue protocol (AMQP). Each API may correspond to a particular application. A particular application may, for example, be operated within the secure data processor 120 or may be operating using one or more of the other systems. As illustrated, system node(s) 180 are remote/cloud nodes that are capable of communicating with other devices (e.g., template author device 150 or other such devices discussed below in reference to FIG. 9) as well as with the secure data processor system 120, thus providing a link between local devices (such as 902, 904, 906, 908, etc. as discussed below) and the secure data processor system 120/other systems. As an example, the data owner system 125, model user system 124, and/or model provider system 122 may comprise system node(s) (such as system node 180) that are specific for a data owner (in the case of data owner system 125), a model user (in the case of model user system 124) and/or model provider (in the case of model provider system 122). A system node(s) 180 may also be associated with a different party other than a model user, model provider or data owner that simply may be a party that has an interest in certain operations to be performed using the systems and techniques described here. For example, a party who is authorized to receive the results of data operations may have its own system node 180.

As shown in FIG. 1, the system may receive (130) from a first system, a first request to validate executable computer instructions for operation by a second system. Such executable computer instructions may define one or more data operations to be performed by the system and may be included within an agreed-upon verified template and/or contract (as explained in further detail below). The first system may be, for example, a model provider system 122. The system may then send (132), by the second system (e.g., the secure data processor system 120) and to a device associated with a blockchain 160, a second request to obtain first data corresponding to the executable computer instructions, wherein the first data corresponds to an agreement between at least a first party and a second party regarding the executable computer instructions. As explained herein two parties (e.g., an algorithm provider and a data owner) may agree upon a verified template governing the relationship of how the data may be processed using the algorithm. The verified template and/or hash data associated therewith, may be stored on the blockchain 160. Thus the first data may include verified template data, hash data, contract data related to the verified template, or other data related to or representing the agreed upon executable computer instructions and/or constraints thereto. The system may then receive (134) the first data from the blockchain 160. As explained herein the first data may include the verified template with the executable computer instructions. The first data may also include a hash of the verified template which the system may use to confirm that the incoming first request corresponds to a previously agreed upon verified template. The system may then determine (136) that the executable computer instructions are permitted to be executed, for example by performing a hash check as detailed below, checking and/or validating the code as explained below, or using some other determination. The system may then cause (138) the executable computer instructions to be executed, wherein execution of the computer instructions results in operating an algorithm associated with the first party (e.g., an algorithm owner) on data associated with the second party (e.g., the data owner). The executable computer instructions may be executed, for example, using a system associated with the second party (e.g., the data owner 125) if the data involved is sensitive. The computer instructions may be executed, for example, by the second system, such as the secure data processor system 120, if the system is so configured. The executable computer instructions may also be executed by a different system (or by a combination of systems, such as a portion by the secure data processor system 120 and a portion by the data owner's system 125) depending on system configuration. Further details of the system are described below.

Figure 2:
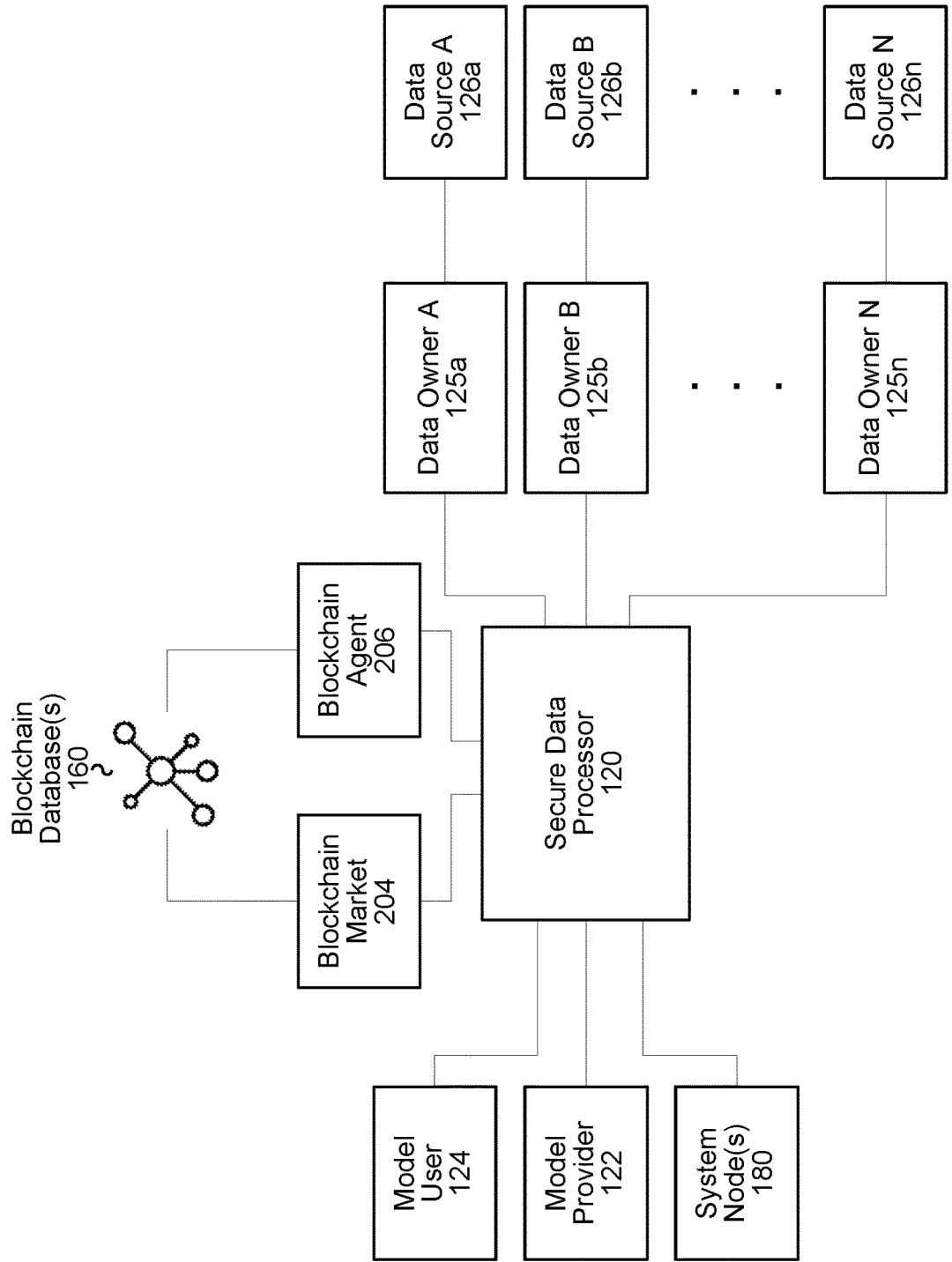
FIG. 2 illustrates a computing environment including a data/model processing system according to embodiments of the present disclosure.

FIG. 2 illustrates a computing environment including a secure data processor 120 according to embodiments of the present disclosure. A secure data processor system 120 may be one or more servers or other devices configured to receive encrypted data from one or more data sources 126 (through one or more data owner system 125). A model provider system 122 may be one or more servers or other devices configured to provide and/or train a model, such as a neural-network machine-learning model, configured to process the data from the data sources 126. The secure data processor system 120 and/or the model provider system 122 may coordinating training of the model using the data from the data sources 126 (for example using the node of data owner 125) by, for example, computing weights of the machine-learning model using, for example, stochastic gradient descent. Once the secure data processor system 120 and/or model provider system 122 trains the model in accordance with one or more metrics, it may send the trained model and/or associated weights to one or more model user systems 124. In some embodiments, a model user system 124 may also include a data source 126. The environment may also include a system node(s) 180 linking devices of other parties to the secure data processor 120.

Although the secure data processor 120, the system node(s) 180, the model provider 122, model user 124, and data owner 125 are illustrated as separate systems, in some embodiments, one or more of the secure data processor 120, the system node(s) 180, the model provider 122, model user 124, and data owner 125 may be the same system. For example, the model provider 122 may also be the model user 124. One or more of the data sources 126 may be the model user 124. The present disclosure is thus not limited to the example environment illustrated in FIG. 2.

FIG. 2 also illustrates one or more blockchain database(s) 160. The blockchain database 160 may use blockchain technology, as one of skill in the art will understand, to maintain a public ledger of information, such as data transmitted using the secure data processor 120. The secure data processor may not communicate directly with the blockchain database 160; instead, it may communicate using a blockchain market 204 and/or a blockchain agent 206. The blockchain database(s) 160 may involve many different physical machines that each store all or some portion of the blockchain data.

The blockchain market 204 may include pointers to data in one or more data sources 126 and may allow access to that data. The blockchain market 204 may further contain information related to one more self-performing contracts (i.e., "smart" contracts) relating to data processes or transmitted by the secure data processor 120. The blockchain agent 206, which may be referred to as an "oracle," may monitor the blockchain database 160 for information and/or changes to information therein, and may transmit data relating to those changes to the secure data processor 120.

The model provider may operate the model provider system(s) 122 to determine one or more models(s) 128*a-n* which may be used to evaluate data. The data from data source(s) 126*a-n* may be obtained from one or more data owner system(s) 125*a-n*. A model user 124 may wish to use a model 128 to evaluate data from a data source 126, however for security and privacy reasons the details of the makeup of the model may be kept secret from the model user 124 and/or the data source(s) 126. Further, the details of the contents of the data may be kept secret from the model user 124 and the model provider. Model(s) and/or data may be encrypted and provided to the secure data processor 120 for evaluation of the data using trained models according to various protected and encrypted arrangements, such as those described, for example, in U.S. patent application Ser. No. 16/361,966 filed Mar. 22, 2019 and entitled "Secure Data Processing"; in U.S. patent application Ser. No. 16/361,982 filed Mar. 22, 2019 and entitled "Neural-Network Training Using Secure Data Processing"; in U.S. patent application Ser. No. 16/362,051 filed Mar. 22, 2019 and entitled "Secure Data Processing Transactions"; in U.S. patent application Ser. No. 16/362,057 filed Mar. 22, 2019 and entitled "Secure Data Processing"; in U.S. patent application Ser. No. 17/072,628 filed Oct. 16, 2020 and entitled "Secure Data Processing"; in U.S. patent application Ser. No. 17/083,789 filed Oct. 29, 2020 and entitled "Secure Data Processing"; in U.S. Pat. No. 11,038,683 issued on May 26, 2021; and in U.S. Pat. No. 10,972,261 issued on Apr. 22, 2021. The above patents and patent applications (referred to as the "Secure Data Processing Applications") are hereby incorporated by reference in their entireties.

As there are a number of privacy concerns surrounding the use and exchange of models, data, etc. to be used with these systems, there are also privacy and trust concerns surrounding the process for agreeing on what operations may be performed with what data. Specifically, in certain situations it may be desirable for parties to be able to exchange executable terms of a smart contract (which themselves may include executable computer instructions) in a manner that both offers some privacy protections but also allows the parties to come to a verified, agreed-upon structure under which to operate the executable instructions to perform operations using certain data, models, etc. For example, the parties may wish to enter into an agreement to allow certain data to be processed under certain conditions. This may occur, for example, with a data owner (DO) that has particularly private data (for example medical information, energy usage information, etc.) and wishes to allow certain entities to use that data but only under certain strict (but perhaps flexible in certain ways) conditions. Such data usage may include any number of operations, but examples may include energy usage in a particular area, number of patients that have used a medical provider during a certain time frame, etc. The conditions under which data may be used may actually rely on underlying data that the parties wish to remain private and protected. (For example, only permitting an energy use query/operation if a certain number of households were actually using energy during a particular time window). Further, the precise executable code/algorithm executed as part of the data usage may be considered private to an algorithm provider (AP) and so such algorithms should be protected from view by other parties. Further, the parties may wish to know that the underlying instructions will perform the desired function without undue edits or variations to the specific code after an agreement on the code/conditions have been reached.

The present disclosure offers components and techniques to address these issues and offer parties a private but protected mechanism for determining desired computer code to perform a task, thus allowing parties to agree on what data may be used and in what manner without disclosing private data to certain entities (such as the algorithm provider) and without disclosing sensitive algorithm code to certain entities (such as a data owner). In particular, the present disclosure offers verified templates and techniques for creating and entering into data use agreements using the verified template structure and approach as disclosed herein. A verified template is a computer file that may include computer instructions (either executable instructions, pseudo-code, or the like) that define a particular task. Certain executable aspects of the instructions may call otherwise private functions, to allow the code underlying those functions to remain private as well. Parties to a verified template may review the contents to determine that the computer instructions to be executed are exactly as intended by the reviewing party, with particular variables that may be introduced, which may be referred to as slots.

A data owner (DO) and algorithm provider (AP) may be parties to a verified template. The data owner may include an entity that has access to a set of data that it wishes to keep private. For example medical data, energy data, consumer data, etc. The data owner may desire to restrict an algorithm provider to only to be able to use the data in a particular manner and under particular conditions. The data owner may wish to propose to the algorithm provider certain conditions to the use of the data in a manner that the data owner can be certain will be adhered to. An algorithm provider (which may correspond to a model user 124) may desire to know that a proposed data operation (sometimes referred to as a data query though the operation may be more general than that) will obtain desired information when the computer executable instructions of the data operation are run, as well as knowing that the conditions proposed by the data owner will be satisfied and that a proposed set of computer executable instructions presented as part of a verified template is valid and would work as intended before finalizing the language of such a template between the parties. Both parties may wish to be able to host and define their own data analysis template(s) that is/are independent of any other parties such as escrows, etc.

As an example, a data owner in the energy field may keep a data storage related to the performance of certain components such as transformers. It may wish to allow a data analyst access to the data for purposes of assessing the health and operability of a transformer with some initial constraints but also some variable constraints depending on the circumstances. The data owner and analyst may use the verified template approach to propose and edit the constraints and operations to be performed on the data as well as to verify that the proposals match and will allow the parties to control/access the data as desired (e.g., the constraints are sufficient for the data owner) to achieve the intended result (e.g., the data to be accessed is sufficient for the analyst). Once approved, the verified template may then be stored in a mutually accessible manner (for example, as part of a blockchain) for retrieval upon execution. Such a constraint may be included within a verified template as executable code, for example an if-then statement or other conditional statement.

As part of the arrangement of the verified template, certain data may be provided to an analyst as part of a verified template while other data may be obfuscated from the analyst. This may be accomplished using agreed upon filters specified in the verified template. For example, energy information of a particular energy meter may be provided but the identifier and underlying user of that energy meter may not be provided. Further, conditions may be applied such as only providing to the analyst energy data for a particular zip code as long as there are X energy meters in the zip code and no one energy meter can contribute more than N percentage of the overall energy usage. This condition may be referred to as K anonymity, thus conditioning access to data on conditions that the data will not reveal too much information about a particular user. Such conditions may be checked and confirmed prior to execution of the data analysis specified in the verified template.

The parties may specify the conditions of use of the data within the verified template and each time the analyst (or other data user) wishes to perform the operations indicated within the verified template the conditions are checked and the data controlled (e.g., data filters are applied to prevent unauthorized access to certain data) prior to running the operation(s) as specified within the verified template. Once agreed upon by the parties, the verified template may become fixed thus preventing any altering of its contents/ terms by either of the parties. The verified template may also include a combination of code and pseudo-code, which may refer to other processes/application programming interfaces (APIs), thus allowing the verified template to function as a shorthand for a full set of executable instructions, thus making the verified template easier to create, edit, and manage, by a user. In certain examples, such as some shown below, Python may be used in the verified template to express computing concepts, but other languages/approaches may be used.

A verified template may be authored by any party. Another party may then review/suggest changes to the authored template until an agreed-upon content of the template is reached. Once agreed-upon, the parties may sign a contract specifying the verified template, thus agreeing to the usage of the data described therein. The verified template may be shared between parties on a side channel (such as email, etc.) but sharing and storing the verified template using the blockchain may allow all parties to sign and agree to its contents while being secure that the contents of the verified template have not been altered. The system may determine one or more hashes (as explained herein) of the template to ensure that a version of the template accessed by a party matches a version stored on the blockchain. Thus, the parties can verify that the code included in a verified template is correct without making the code of the template available for others to see. A party to the verified template may also provide access to the template to one or more third parties, for example to perform checks such as whether the offered code in the template conforms to some standard such as a data security standard. The third party may access the verified template and/or its hash or other information from one of the original parties and/or from the blockchain.

If a template/agreement author provides content of an agreement at its creation time, the responding party must also supply the template at the time of agreement to validate that both parties have seen and are agreeing to the same contract. The system may store hashes, for example, of the Python objects defined in the template. A hash function as used herein may include an operation where arbitrary sized data is reduced in a determinative fashion, into a fixed-length output, such as a text string. The same input data may result in the same output hash, thus a hash function may be used to ensure that a certain input matches some previous input by comparing the resulting hashes, thus allowing a comparison of the two inputs without necessarily having access to the inputs themselves. The system may use hash functions to allow parties to confirm that a verified template/contract that the parties have agreed has the same content as the same verified template/contract that is obtained from another source (e.g., the blockchain 160) and that is to be used to perform a data operation.

The verified template is a base for what is needed to perform data processing operations that is agreed upon by the parties. However the verified template itself may not be executable on its own and may require certain fields/slots to be filled in order to be fully executable. Thus, a filled template, which includes those values, may be what is ultimately executed at runtime. Thus the verified template represents the agreed operations that may occur with the prescribed data and under what conditions, however the filled template actually includes values (e.g., identifies a specific data store from which data may be retrieved for processing, or the like). The same verified template may be filled in different ways multiple times to perform multiple different data queries/operations. Thus the verified template may be established based on the relationship between the parties and it may be filled with certain values when data is to be analyzed. The verified template may be available for repeated access, for example on the blockchain as described herein.

As may be appreciated, two (or more) parties may agree on the contents of a verified template while a different (e.g., third) party (who is authorized to cause execution of the code of the verified template) may actually use the verified template once the template is filled and ready for execution. In such a situation the third party may receive a filled template, verify that it matches the verified template (for example, by comparing one or more hash values available through the blockchain), and then use the filled template to execute the data processing (e.g., operation using the protected data).

A data operation specified in a verified template may involve any use of data as agreed upon by the parties. That use may include a use for purposes of analyzing the data (e.g., analyzing energy usage of a group of energy meters as represented by energy data in a data store 126), for purposes of processing the data to create a machine-learning model (e.g., using data in a data store 126 to train a model for a specific purpose), or other data operation.

An example verified template (that may, for example, be created by a data owner) is illustrated below. In this example, the verified template includes a single Python file that contains a certain number of function definitions (with two shown below). At least of the function may be a function defined as "main" (though other function names may be used) which may have the correct signature/configurations to execute a function using the secure data processor 120.

Example 1: Verified Template

```
1 def get_data(db, tables):
2         df = ap_query (df, tables)
3         return df
4
5 def main(db, tables, results_path, write_schema, **kwargs) :
6         output_filename = "output.txt"
7         df = get_data(db, tables)
8         return [output_filename]
```

As shown in template example 1 above, the verified template contains two function definitions, main and get_data. The example is missing a definition for ap_query which is to be supplied by another party (for example an algorithm provider) pursuant to a contract/agreement between the parties. Any objects not defined within the verified template must be defined by the party (for example an algorithm provider) that attempts to submit the (filled) template for operation by the secure data processor 120.

A template may be "filled," for example, by another party defining missing functions, parameters, etc. Thus the process of filling a template involves assigning a value to a variable/parameter and may not necessarily alter the structure of an agreed upon verified template. An example of the verified template above filled to include the missing function ap_query is shown below.

Example 2: Filled Template

```
1 def  ap_query(db, tables):
2         import pandas as pd
3         df = pd.DataFrame( )
4         return df
5
6 def  get_data(db, tables):
7         df = ap_query(db, tables)
8         return df
9
10 def main(db, tables, results_path, write_schema, **kwargs):
11         output_filename = "output.txt"
12         df = get_data(db, tables)
13         return [output_filename]
```

As can be seen, in Python, new data that "fills" the template may be prepended (i.e., placed before) the content of the original verified template. This may occur due to the top down nature of a Python code execution, but other arrangements of filling a template may also be configured. The filled template may assign values or add to the original code of the verified template but may not alter the original code of the verified template in a material way. In other words, the code of the verified template takes precedence/has priority over anything added as part of the filling of the template. For example, the new material may not redefine or change any variable or object that is fully defined in the original code of the verified template. When the new and original code is compiled/interpreted, any new objects added must be permitted/specified by the original code.

Figure 3:
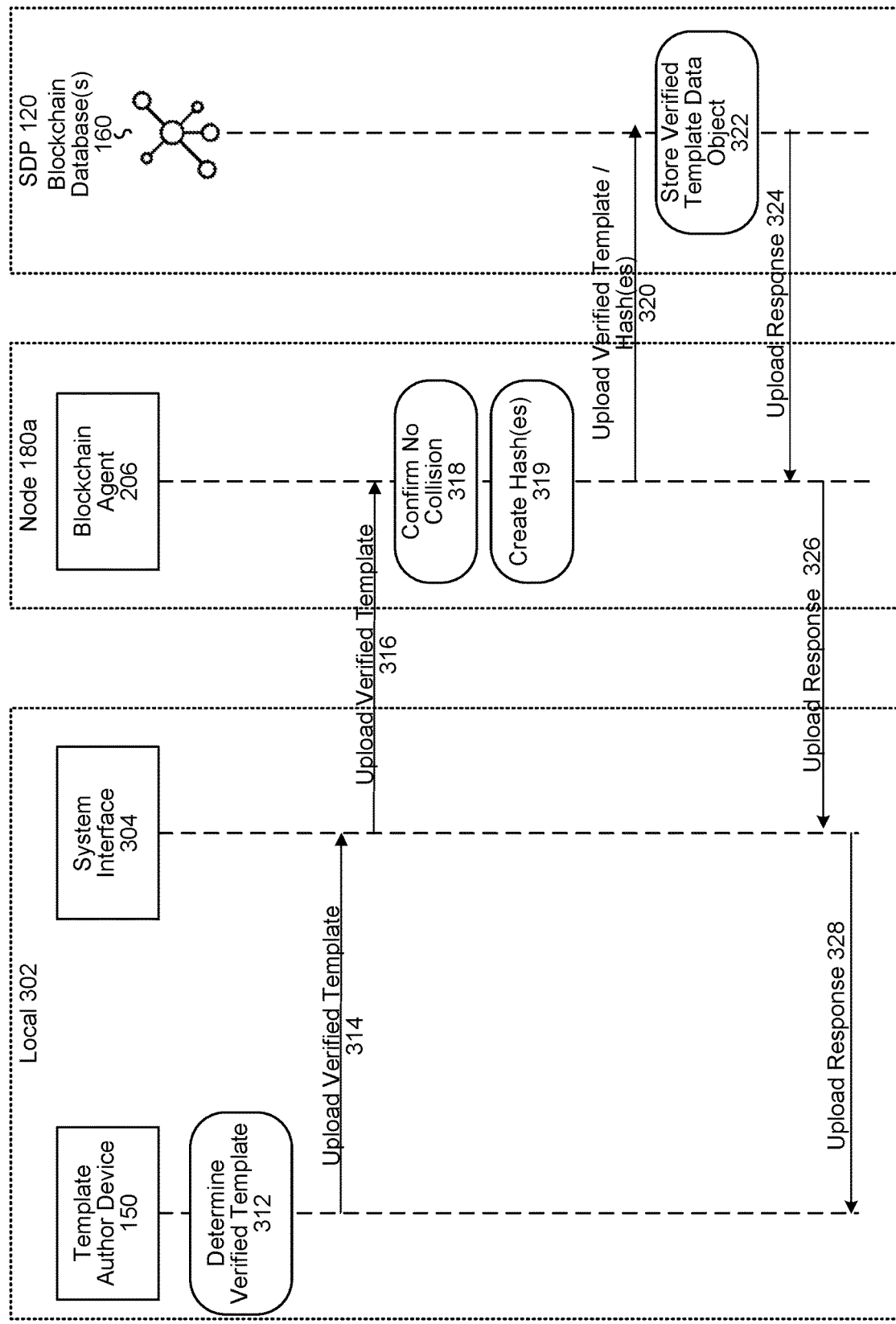
FIG. 3 shows an example of system operation for determining a verified template and storing it on the blockchain for later retrieval according to embodiments of the present disclosure.

Once a verified template is created, the template author may make the verified template available to other parties to the eventual agreement (e.g., other DOs, APs, or entities associated with secure data processor 120). One way of doing so, particularly if the author wishes the verified template to be public, is to store the verified template itself on the blockchain. An example of this process is shown in FIG. 3. As shown, a template author may use a device 150 to determine/define (312) a verified template. The verified template may define a data operation that includes computer executable instructions specifying one or more operations to be performed on one or more sets of data. The template author may be any party that has an interest in a particular data operation to be performed, such as an algorithm provider, data owner, party that has an interest in results of a data operation, etc. Each of the interested parties may have an opportunity to review and approve a verified template (and/or filled template/contract as described below) using the described system prior to the execution of a data operation.

The device 150 may use specialized software designed to create verified templates for use with secure data processor 120. The software may include a library or other tools to assist with the creation of verified templates. For example, the software may include various available functions, parameters, etc. that may be used to perform data queries or other operations using secure data processor 120. The author may then upload (314) the verified template to a system interface 304. The template author device 150 and the system interface 304 may be included as part of a local system 302 that is local to the template author. The system interface 304 may be separate from other programs, etc. (such as email, a word processing program, etc.) which may reside on the template author device 150, hence the illustration of the system interface 304 being separate from the template author device 150. The system interface 304 may communicate, via network 170, APIs, etc. with node 180a, SDP 120 and/or other systems. The interface 304 may thus interface with system node 180a which may include the blockchain agent 206. The system node 180a is a node that is associated with the template author and acts as an intermediary between the local system 302 and the secure data processor system 120/blockchain 160. (As the example of FIG. 3 does not specify the particular role of the template author a generic system node 180a is described, but this node could also be considered a data owner node 125, a model provider node 122, etc. depending on the party that is the template author.) The system interface 304 uploads (316) the verified template to the blockchain agent 206. The blockchain agent 206 may confirm (318) that there is no collision between the uploaded verified template and other files on the blockchain 160. This verification of no collision may include, for example, performing a hash of the verified template and confirming that data with the same hash is not already stored on the blockchain 160. Another example may be verifying that there is no existing template on the blockchain 160 with the same name and version as the verified template in question. If a new version of an existing verified template is to be uploaded to the blockchain 160, the system (for example through blockchain agent 206) may also confirm that the new version is authored by the same entity as the previous version of the verified template. For example, the system may reject a new version of a verified template unless a key/author ID (which may indicate the template author device 150, the specific blockchain agent 206 of node 180a, or some other characteristic). The key/author ID may be a unique identifier for the particular party that the party uses to perform interactions with the secure data processor system 120. If there is some collision or error the blockchain agent 206 may submit an error message to be ultimately returned to the author template's device 150 for correction of the verified template name, version, contents, etc. prior to submission to the blockchain database(s) 160.

The blockchain agent 206 may then create (319) one or more hashes for the verified template. The hashes may then be used downstream to ensure that the verified template retrieved from the blockchain 160 matches the original verified template submitted by the template author device. A single hash may be created for the entire verified template. Such a single hash will allow a downstream operation to determine if any portion of the verified template has changed, as any change will result in a different resulting hash. However this may not provide sufficient precision for a downstream user to determine what portion of a downstream verified template may not match an original verified template, which may be useful for parties to more easily resolve potential issues. Thus, multiple hashes may be made for a single verified template. One hash may represent the entire template itself. Another hash may be performed for a single object or section of code of the verified template. For example, using the verified template of Example 1, the system may determine one hash for the object of lines 1-3 of the code, another hash for lines 5-8 of the code and another hash for the entire template itself. In this manner, a downstream user can check to see if any of the particular sections of a retrieved verified template do not match the corresponding sections of the original template. Many different hash combinations are possible (for example hashing line by line, section by section, for the entire template, or some combination thereof) where the different hash combinations allow the system to perform different checks at different levels of the template depending on desired system performance. The hashing may be performed at the node 180a corresponding to the template author and/or may be performed on a node or other component that is part of secure data processing system 120.

The blockchain agent 206 may then upload (320) the verified template and/or its corresponding hash(es) to the blockchain 160. The blockchain 160 may thus store particular information indicating the verified template which may be retrieved at a later time. If the template itself is to be stored on the blockchain 160, it may be encoded, for example in base64 byte representation, and the resulting encoding may be stored on the blockchain 160 along with other information identifying the verified template. For example, the blockchain 160 may store (322) a data object (illustrated as a JSON object) as shown in the below example:

---
Example 3: Verified Template Blockchain Object
---

```
 1 {
 2 "verifiedTemplate": {
 3         "templateid" : "string", # unique
 4         "creationDate" : "2019-06-06T20 : 15 : 27. 916Z",
 5         "name" : "string", # unique unless a new version
 6         "description" : "string",
 7         "authorPublicKey" : "string",
 8         "version" : "major.minor.patch",
 9         "template" : "base64 encoded copy of the template",
10         "previousVersionid" : "string" # optional
11         }
12 }
```

As can be seen the verified template data object stored on the blockchain 160 may include a unique template ID, a creation data, a name, description, the author's public key, version information, the encoded version of the template itself, as well as other information such as the ID of a previous version of the template (if applicable) for purposes of version tracking. The verified template blockchain object may also include one or more hash values as determined by the described hash operations. The blockchain 160 may then return an upload response 324 which is passed through the blockchain agent 206 to the system interface 304 (326) and to the template author's device 150 (328). The upload response may include information about the verified template data object (which may include a copy of the data object itself or portions thereof) including how to access the verified data object using the blockchain 160.

The verified template author may now send to another party information on how to access the verified template using the blockchain 160 (for example by sending them the template ID and/or other information). The recipient may then retrieve the stored verified template from the blockchain 160 and may be assured that the verified template they have retrieved is the verified template put there by the template author.

An established verified template that is stored on the blockchain 160 may be used to create an agreed-upon smart contract between an AP and DO, for example as illustrated in FIG. 4. In the example of FIG. 4, a template author may have come to an agreement with another party, shown as the algorithm provider 402, as to the contents of a verified template that was submitted by the template author to the blockchain 160 (for example according to the operations of FIG. 3). The algorithm provider 402 may thus set out to create a smart contract offer to agree to use that particular verified template (that is available on the blockchain 160) for purposes of coming to an agreement with regard to certain data usage and operations specified in the verified template. The smart contract may can include other terms regarding an agreement between the parties and may be stored on the blockchain in a similar manner as was the verified template. For example, the algorithm provider 402 may specify a verified template name and version, a name of the contract, a description of the contract, a description of the datasets to be involved, restriction levels, and the like. The verified template name and version may have been provided, for example, from the template author to the algorithm provider. As part of creation of the contract, the algorithm provider may confirm that the verified template placed on the blockchain 160 includes the same contents as the verified template agreed upon by the parties. (Such an agreement may have happened outside of the secure data processing environment, for example over email, using a shared cloud document, etc.) The name of the verified template and version (and other information) may be sent (412) from the algorithm provider 402 to a contract creator 404. The contract creator 404 may be an interface, for example, capable of communicating with the secure data processor 120 that facilitates the entry into agreements for parties to allow access to and use of secure/encrypted data/models using the systems herein. The algorithm provider 402 and contract creator 404 are shown as part of a local system 410 which is local to the algorithm provider 402. The contract creator 404 may create a contract data object, such as the data object (illustrated in JSON format) shown below:

Example 4: Contract Data Object with Template Name and Version

```
1 {
2   "contract" : {
3     ...
```

| Example 4: Contract Data Object with Template Name and Version |
|---|
| 4   "verifiedTemplates" : [{ |
| 5     "templateName" : "name on blockchain" |
| 6     "templateVersion" : "version on blockchain" |
| 7   }] |
| 8   ... |
| 9   } |
| 10 } |

The contract creator 404 may then send (414) the contract object to the blockchain agent 206 which may request (416) the specified verified template from the blockchain database(s) 160. The retrieved template data (which may include the entire template and/or hashes thereof along with other data) may then be sent (418) to the blockchain agent 206 which then sends (420) the verified template data to the templates library 406. The blockchain agent 206, verified templates library 406 may be part of a separate system, for example part of a node 180*b* which may be a model provider node 122 (if the verified template involves the use of a model). The verified templates library 406 may have its own record of the previously agreed upon verified template (and/or hashes corresponding thereto) that was previously agreed upon between the algorithm provider and the other party (e.g., the template author) and may process the template data retrieved from the blockchain 160 to ensure the retrieved verified template matches the agreed-upon verified template.

The verified templates library 406 may retrieve the previously stored hashes that go with the previously agreed upon verified template. Alternatively the verified templates library 406 may create those hashes using the previously agreed upon verified template. The verified templates library 406 may then compare (422) the hash(es) of the previously agreed upon verified template to those obtained from the blockchain 160 in steps 418/420. If the hash(es) match, and the system confirms the verified templates match, the system may continue creating a contract referring to the verified template stored on the blockchain 160 (since that verified template has now been confirmed as correct).

Accordingly, the blockchain agent may then send (424) the hash(es) of the verified template to the blockchain agent 206. The blockchain agent 206 may create (426) a completed contract data object that includes the encoded template itself (rather than simply referring to it) as shown below:

Example 5: Contract Data Object with Template

```
1 {
2   "contract" : {
3     ...
4     "verifiedTemplates" : [{
5       "template" : "base64 encoded template"
6     }]
7     ...
8   }
9 }
```

The contract data object may also include the hash(es) corresponding to the verified template. These hash(es) may again be used to confirm the matching of the verified template when the contract data is used later downstream.

The contract data object may also be signed with a particular key/ID associated with the specific blockchain agent 206 and may also indicate a particular key/ID associated with other party/parties that are permitted to cause execution of the contract/the computer code of the verified template. The contract data object may also reflect other contractual terms such as the ID of one or more datasets to be accessed (which may be stored on the blockchain 160 and may have an associated data owner), begin date, termination date, or other information. The completed contract data object may then be submitted (428) to the blockchain 160 which may store (430) the contract and return a contract response (432) to the blockchain agent 206 which in turns sends (434) the response to the contract creator 404 which sends (436) it on to the algorithm provider 402. The response may include information about the contract data object (which may include a copy of the data object itself or portions thereof) including how to access the contract data object using the blockchain 160.

Once the contract data object is stored on the blockchain 160, another party, such as a data owner, may use the blockchain 160 to retrieve the contract to verify and sign it, for example by comparing the hashes to confirm the contract includes the appropriate terms and using a digital signature/approval process. Following approval of the contract, the verified template that was part of the contract may be used by the secure data processor 120 to actually execute the data queries or other specified operations.

A smart contract may also be created and stored on the blockchain 160 even if the verified template itself is not available on the blockchain. For example, as shown in FIG. 5, a contract creator, in this example an algorithm provider 402, may set out to create a smart contract offer to agree to use a verified template that is not available on the blockchain 160 for purposes of coming to an agreement with another party on certain data usage. The smart contract may can include other terms regarding an agreement between the parties and may be stored on the blockchain in a similar manner as was the verified template. For example, the algorithm provider 402 may send (512) a verified template (and potentially other information such as a name of the contract, a description of the contract, a description of the datasets to be involved, restriction levels, and the like) from the algorithm provider 402 to a contract creator 404.

The contract creator 404 may then send (514) the verified template and other contract data to the blockchain agent 206 and to (520) the templates library 406. The verified templates library 406 (which may, for example, be a component of secure data processor 120) may create (522) a hash/encoding of the template and send (524) the hash(es) to the blockchain agent 206. The blockchain agent 206 may create (526) a completed contract d7ata object that includes the hash(es) of the template. The contract data object may also reflect other contractual terms such as the ID of one or more datasets to be accessed (which may be stored on the blockchain 160 and may have an associated data owner), begin date, termination date, or other information. An example of such a contract data object is shown below:

Example 6: Verified Template Contract Data Object

```
1 {
2  "contract" : {
3    ...
4    "verifiedTemplates" : [{
5      "templateid" : "string" # Optional
```

-continued

Example 6: Verified Template Contract Data Object

```
6      "verifiedTemplateLibraryVersion" : "major.minor.patch"
7      "hashes" : [{
8        "objectType" : "string",
9        "objectHash" : "string"
10     }]
11   }]
12   ...
13  }
14 }
```

The contract data object may also include a key to map of verified template hashings. Thus the verified templates key may map to a list of maps that contains a template ID which is a string, a version, which is the version of the hashing library and the hashes which is a list of maps containing the object name and object hash.

The completed contract data object may then be submitted (528) to the blockchain 160 which may store (530) the contract and return a contract response (532) to the blockchain agent 206 which in turns sends (534) the response to the contract creator 404 which sends (536) it on to the algorithm provider 402. The contract response may include information about the contract data object (which may include a copy of the data object itself or portions thereof) including a contract ID, version information, how to access the contract data object using the blockchain 160, etc.

Once the contract data object is stored on the blockchain 160, another party (for example a data owner) may use a portion of the contract response (such as the contract ID or the like) to retrieve the contract from the blockchain 160 to verify and/or sign it, for example using a digital signature/approval process. Following approval of the contract, the verified template that was part of the contract may be used by (for example by the secure data processor 120, data owner system 125, and/or other system) to actually execute the data queries or other specified operations.

As the verified templates may involve executable computer instructions, when submitting a verified template a party may wish to ensure that included computer instructions compile properly and/or satisfy any other operation requirements, such as those of the secure data processor 120. Ensuring such operational requirements are satisfied may save resources exchanging and/or storing verified templates that may not be operationally satisfactory (for example by including code with syntax or other errors) and may result in quicker template/contract agreement between parties. An example of the process of obtaining, filling, and checking a verified template is illustrated in FIG. 6. Although FIG. 6 illustrates such operations being performed by an algorithm provider, contract/template checks/validations may be performed by any party with access to the contract/template.

As shown in FIG. 6, a party such as an algorithm provider 402 may request (612) a template from the system interface 304, which may include an app or other interface running on a local system 410, such as on a device of the algorithm provider 402. The system interface 304 may be separate from other programs, etc. (such as email, a word processing program, etc.) which may reside on the device of the algorithm provider 402, hence the illustration of the system interface 304 being separate from the algorithm provider 402. The system interface 304 may communicate, via network 170, APIs, etc. with a system such as SDP 120 and/or other systems. That request is then passed (614) from the system interface 304 to the blockchain agent 206 and on (616) to the blockchain database 160 which then sends (618) the template to the blockchain agent 206, which in turn sends it (620) to the system interface 304 and to (622) the algorithm provider 402. The algorithm provider 402 may then create (624) a filled template including the values/parameters that would be used to go from a verified template to an actionable contract (for example, a filled template described above in reference to Example 2) for analyzing data. The algorithm provider 402 may then send a request (626) to have the filled template validated to make sure that it meets the operational parameters of the system in which the code of the template is to be run (for example the secure data processor 120). The request may go to the system interface 304 and then on (628) to the validation component 602. The validation component 602 may send a check request (630) to the templates library 406 to confirm that the template being received is a valid template for use in the system. The templates library 406 may then run a check (632). The templates library 406 may check code syntax, ensure functions and objects are properly defined, and perform a number of other checks to ensure the contents of the verified template are valid for execution. The check may also include a comparison of hash(es) of the template obtained from the blockchain 160 and the template previously agreed upon and known to the templates library 406. As discussed above in reference to Example 2, a "filled" template may simply involve a verified template with the additional information prepended before the contents of the original verified template. This may allow the system to compare hash(es) of a filled template to the hash(es) of an original verified template and determine that the hash(es) corresponding to the original template portions match, thus indicating that the verified template itself has not been altered.

The templates library 406 may confirm that the template being submitted is authorized for use with the system (for example the template is authorized for use with the secure data processor 120) and may return a check response (634) to the validation component 602.

The validation component 602 may then run (635) a validation using the filled template. The validation run may involve a freeform pass and execution where the validation component 602 may attempt to run the code in the filled template, only using dummy data (e.g., not the precise data specified in the verified template). Such dummy data may include random data formatted in a way that can test operation of the executable instructions specified in the verified template. For example, the dummy may have the correct types of data (e.g., integers, floating values, etc.) in the same arrangement (e.g., columns and rows), etc. for testing purposes. The purpose of this validation is to ensure that the computer executable instructions in the verified template will run as intended as part of the system and will not result in any processing errors. This validation may not use the data specified in the verified template in order to protect the data from unnecessary access. The validation component 602 may then return (636) a validation response to the system interface 304 which may pass the validation response (638) on to the algorithm provider 402 (or other requesting party). If the computer executable instructions of the verified template are appropriate for execution that may be indicated in the response. If they are not, certain errors and/or offered corrections may be returned so that the template may be corrected (and, if necessary, submitted to the blockchain 160 as a new version).

Although FIG. 6 illustrates validation of a template obtained from the blockchain 160, verification may also be performed using a verified template obtained from other sources where the process of FIG. 6 may be performed without steps 612-622.

Figure 7A:
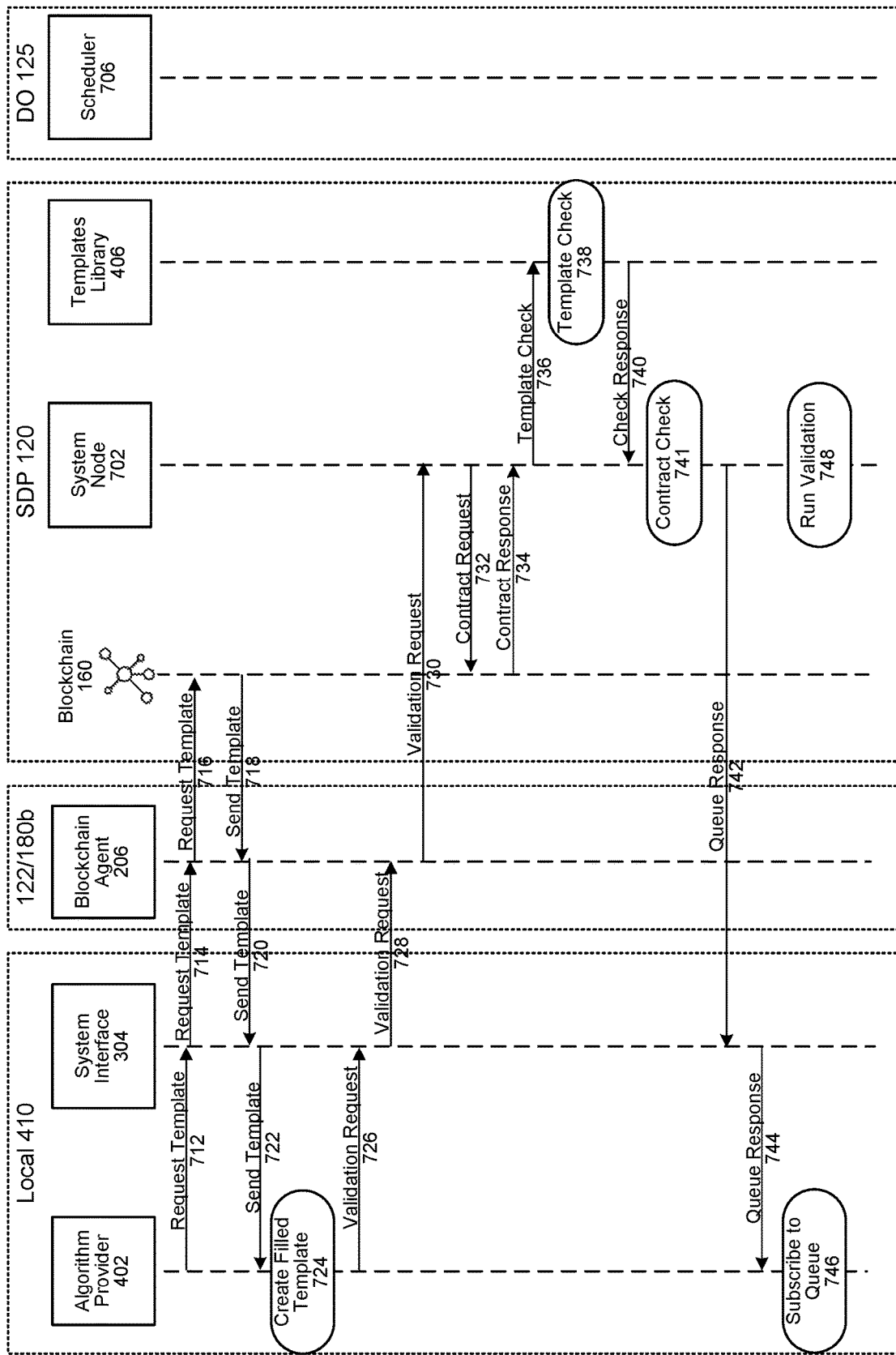
FIGS. 7A and 7B show an example of obtaining, validating, and operating a verified template with a secure data processing system according to embodiments of the present disclosure.
Figure 7B:
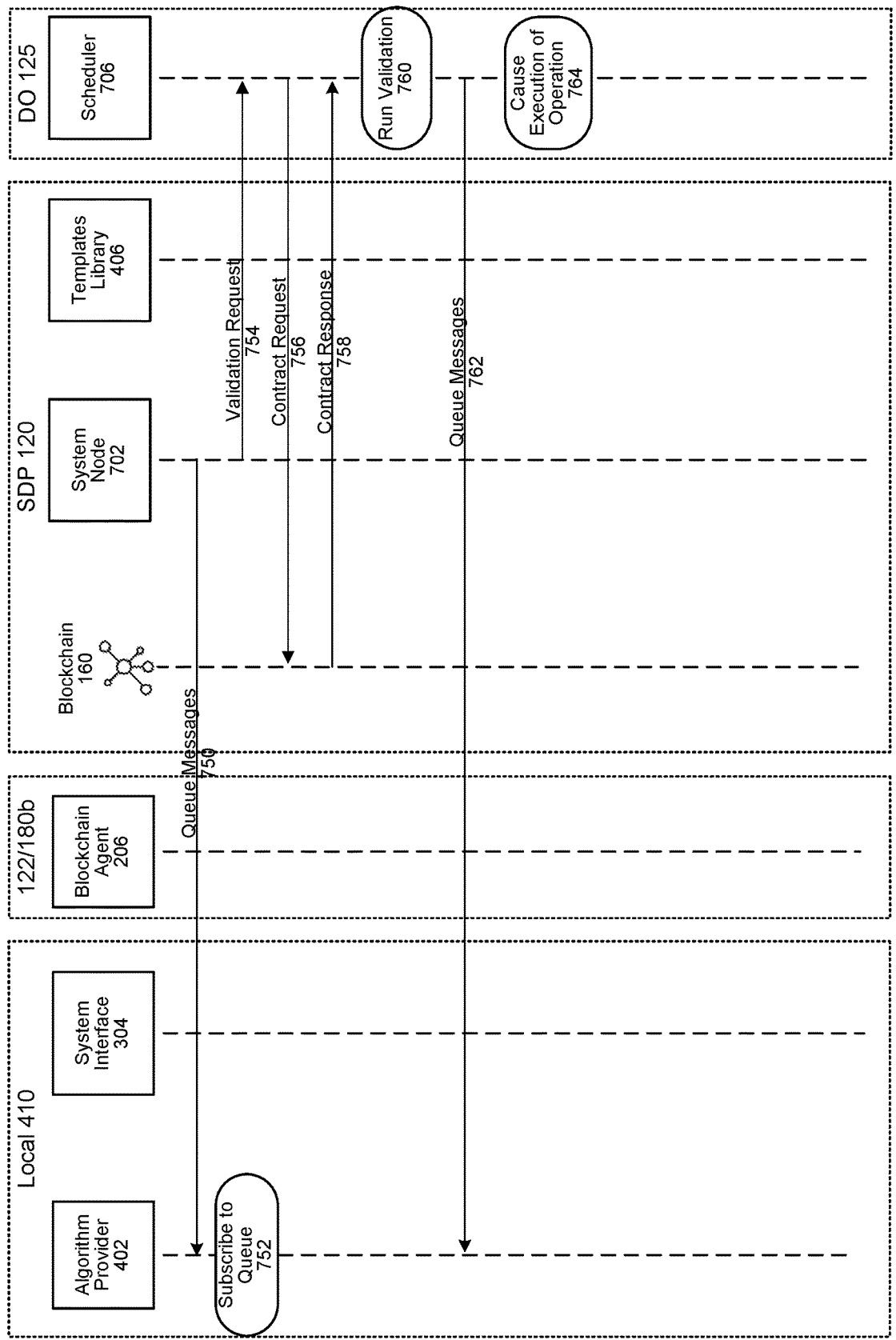

Before actually executing the code of the contract, different systems may validate a filled verified template against a previously agreed-upon smart contract to ensure the template has not changed and that the algorithm provider has only added new code that completes the template according to the agreed upon contract. FIGS. 7A and 7B show an example of obtaining, validating, and operating a verified template with a secure data processing system according to embodiments of the present disclosure. As discussed above in reference to other figures, a party, such as an algorithm provider 402 may wish to execute a contract that specifies a verified template/executable computer instructions as described above. The verified template may be one that has already been included in the contract agreed upon by multiple parties and placed on the blockchain 160. As shown in FIG. 7A, an algorithm provider 402 may request (712) a verified template using the system interface 304, which may include an app or other interface running on a local system 410, such as on a device of the algorithm provider 402. The system interface 304 may be separate from other programs, etc. (such as email, a word processing program, etc.) which may reside on the device of the algorithm provider 402, hence the illustration of the system interface 304 being separate from the algorithm provider 402. The system interface 304 may communicate, via network 170, APIs, etc. with a system such as SDP 120 and/or other systems. The system interface 304 may send (714) the verified template request to the blockchain agent 206 which in turn requests (716) the verified template from the blockchain 160. The blockchain 160 may then send (718) information about the verified template to the blockchain agent 206 which in turn sends (720) it on to the system interface 304 and to (722) the algorithm provider 402.

The algorithm provider 402 may then create (724) a filled template including the values/parameters of the data operations the algorithm provider 402 wishes to have performed. Such values/parameters may be used to go from a verified template to an actionable contract (for example, a filled template described above in reference to Example 2) for analyzing data. The algorithm provider 402 may then send a request (726) to have the filled template validated to make sure that it meets the operational parameters of the system in which the code of the template is to be run (for example the secure data processor 120). The request 726 may also include an identifier of the contract that will govern execution of the instructions to run the data operation as specified in the filled verified template. The request may go to the system interface 304 and then on (728) to the blockchain agent 206. The blockchain agent 206 may sign the validation request with a key/identifier corresponding to the particular block agent 206 of the node 180b/122 as going with the algorithm provider. Thus, when the validation request 730 is sent from the blockchain agent 206 to the system node 702, the request comes signed by a party that is recognized by the secure data processor system 120 as being permitted to cause execution of the contract.

The system node 702 (which may include a component/code corresponding to the secure data processing system 120) may then request (732) the contract from the blockchain 160. The blockchain 160 will then respond (734) to the system node 702 with the contents of the contract. The system node 702 may then send a check request (736) to the templates library 406 to confirm that the filled verified template as represented in the contract being received is valid for use in the system. The templates library 406 may thus then run a check on the now filled verified template (738). The templates library 406 may check code syntax, ensure functions and objects are properly defined, and perform a number of other checks (e.g., comparison of hash(es) as discussed herein) to ensure the contents of the verified template are valid for execution. The templates library 406 may confirm that the filled verified template being submitted is authorized for use with the system (for example the template is authorized for use with the secure data processor 120) and may return a check response (740) to the system node 702.

The filled contract (e.g., the contract data), received by the system node 702 as part of the validation request 730, may include a copy of new code representing values or other data to be used with the instructions of the verified template along with a copy of the verified template. For example, a filled verified template (e.g., a filled verified template in the form of Example 2 above) may include new code prepended to a verified template (e.g., a verified template in the form of Example 1 above) for inclusion in the contract data. The system node 702 may check (741) other constraints/content of the contract (which may be independent of the verified template) to ensure that the contract is appropriate for execution. For example, the system node 702 may parse the contract data and check that the validation request 730 is allowed under any other constraints contained within the contract. If the constraints are met the system node 702 may so indicate, thus approving the validation request 730 to proceed to validation (748) or to further execution by the system.

As illustrated in FIG. 7A, the system node 702 is part of the secure data processor system 120 and thus provides separation between the algorithm provider 402/local system 410 and the data owner system 125. Thus the party that wishes to actually execute the code may not have access to the secure data processor system 120. This separation ensures that no involved party can interfere with the verification process. To inform the algorithm provider 402 that the contract check has completed and that the validation has begun, the system node 702 will begin a queue for the validation and send a queue response 742 to the system interface 304 which is sent (744) to the algorithm provider 402. This queue response allows the algorithm provider 402 to subscribe (746) to the queue so that the algorithm provider 402 may monitor the validation process.

The system node 702 may then run the validation 748 which may involve executing the code of the contract using fake data to ensure that the code will execute properly when run against the data of the data source 126. Once that validation completes (and indicates no errors) the system node 702 will allow the data owner system 125, which controls access to the data source 126 to run its own validation. Thus the system node 702 may then create a new queue for the data owner's validation, and, as illustrated in FIG. 7B, will send a queue message (750) to the algorithm provider 402 and allow the algorithm provider 402 to subscribe (752) to that queue so that the algorithm provider 402 may monitor the validation process performed by the data owner. The system node 702 may also send a validation request (754) to a scheduler 706 of the data owner system 125. The validation request 754 may include and/or refer to the contract, filled template, and/or the verified template. The scheduler 706 may run its own validation to satisfy the data owner that the proper template will be used to run the data operation on data of a data store 126 controlled by the data owner 125. This validation may involve the scheduler 706 making a request (756) to the blockchain 160 to retrieve the contract/verified template which is sent (758) to the scheduler 706. If the blockchain 160 only stored the hash of the contract/verified template, that hash may be retrieved from the blockchain 160. The scheduler 706 may then run (760) the validation of the contract/verified template data sent by the system node 702 against the contract/verified template data sent by the blockchain 160. This may involve comparing the hashes to ensure that they match. The scheduler 706 may also send a queue message 762 to the algorithm provider 402 to apprise the algorithm provider 402 of the status of the validation.

Once the code has been validated according to the steps above, the system may cause execution (764) of the data operation as specified in the verified template. As the data operation specified in the verified template may involve operation on sensitive data, the execution of the executable computer instructions that make up the data operation may take place (for example as illustrated in FIG. 7B) using components belonging to a system of the data owner. For example, the executable computer instructions of the verified template/contract may run on node 125, which corresponds to the data owner but also may interact with secure data processor system 120, and thus prevents access to data store 126 to anyone outside of the data owner. However, depending on system configuration, the system may not allow the executable computer instructions of the verified template/contract to run on a device of the data owner that is not associated with secure data processor system 120, thus preventing the computer instructions of the verified template/contract from operating on a private device of the data owner. This may prevent sensitive code/models from being exposed to the data owner outside the secure protections of the secure data processor system 120/data owner node 125.

The executable computer instructions may also (or in the alternative) be executed by the secure data processor system 120, if the system is so configured. The executable computer instructions may also be executed by a different system (or by a combination of systems, such as a portion by the secure data processor system 120 and a portion by the data owner's system 125) depending on system configuration. Other systems described herein may also execute all or a portion of the executable computer instructions depending on the terms specified in the agreed-upon verified template/contract.

The data operation, as specified in the verified template/contract as described herein may include any operation as agreed to by the respective parties, including one or more data operations described in the Secure Data Processing Applications referenced above, or any other data operation.

As can be appreciated, while the verified template/contract may include certain computer executable instructions, it may not include all the computer executable instructions that may be executed for a particular data operation. If permitted by system configuration, the verified template/contract may include function or object reference calls, API calls, or otherwise refer to code that is not included within the verified template/contract itself. Such code may reside elsewhere (for example with secure data processor 120, another node 180, etc.) and may be called and executed during operation of the data operation of the verified template. Such references may be permitted if agreed upon by the parties to the verified template/contract. Further, the verified template/contract may refer to data that is not incorporated into the verified template/contract. Such data may be the subject of the operation to be performed and may be large and private and thus not included in the verified template/contract.

FIG. 8 is a block diagram illustrating a computing environment that includes a server 800; the server 800 may be the secure data processor system 120, the model user system 124, the data owner 125, the blockchain 160, the model provider system 122, and/or the system node(s) 180. The server 800 may include one or more physical devices and/or one or more virtual devices, such as virtual systems that run in a cloud server or similar environment. The server 800 may include one or more input/output device interfaces 802 and controllers/processors 804. The server 800 may further include storage 806 and a memory 808. A bus 810 may allow the input/output device interfaces 802, controllers/processors 804, storage 806, and memory 808 to communicate with each other; the components may instead or in addition be directly connected to each other or be connected via a different bus.

A variety of components may be connected through the input/output device interfaces 802. For example, the input/output device interfaces 802 may be used to connect to the network 170. Further components include keyboards, mice, displays, touchscreens, microphones, speakers, and any other type of user input/output device. The components may further include USB drives, removable hard drives, or any other type of removable storage.

The controllers/processors 804 may processes data and computer-readable instructions and may include a general-purpose central-processing unit, a specific-purpose processor such as a graphics processor, a digital-signal processor, an application-specific integrated circuit, a microcontroller, or any other type of controller or processor. The memory 808 may include volatile random access memory (RAM), non-volatile read only memory (ROM), non-volatile magnetoresistive (MRAM), and/or other types of memory. The storage 806 may be used for storing data and controller/processor-executable instructions on one or more non-volatile storage types, such as magnetic storage, optical storage, solid-state storage, etc.

Computer instructions for operating the server 800 and its various components may be executed by the controller(s)/processor(s) 804 using the memory 808 as temporary "working" storage at runtime. The computer instructions may be stored in a non-transitory manner in the memory 808, storage 806, and/or an external device(s). Alternatively, some or all of the executable instructions may be embedded in hardware or firmware on the respective device in addition to or instead of software.

Figure 9:
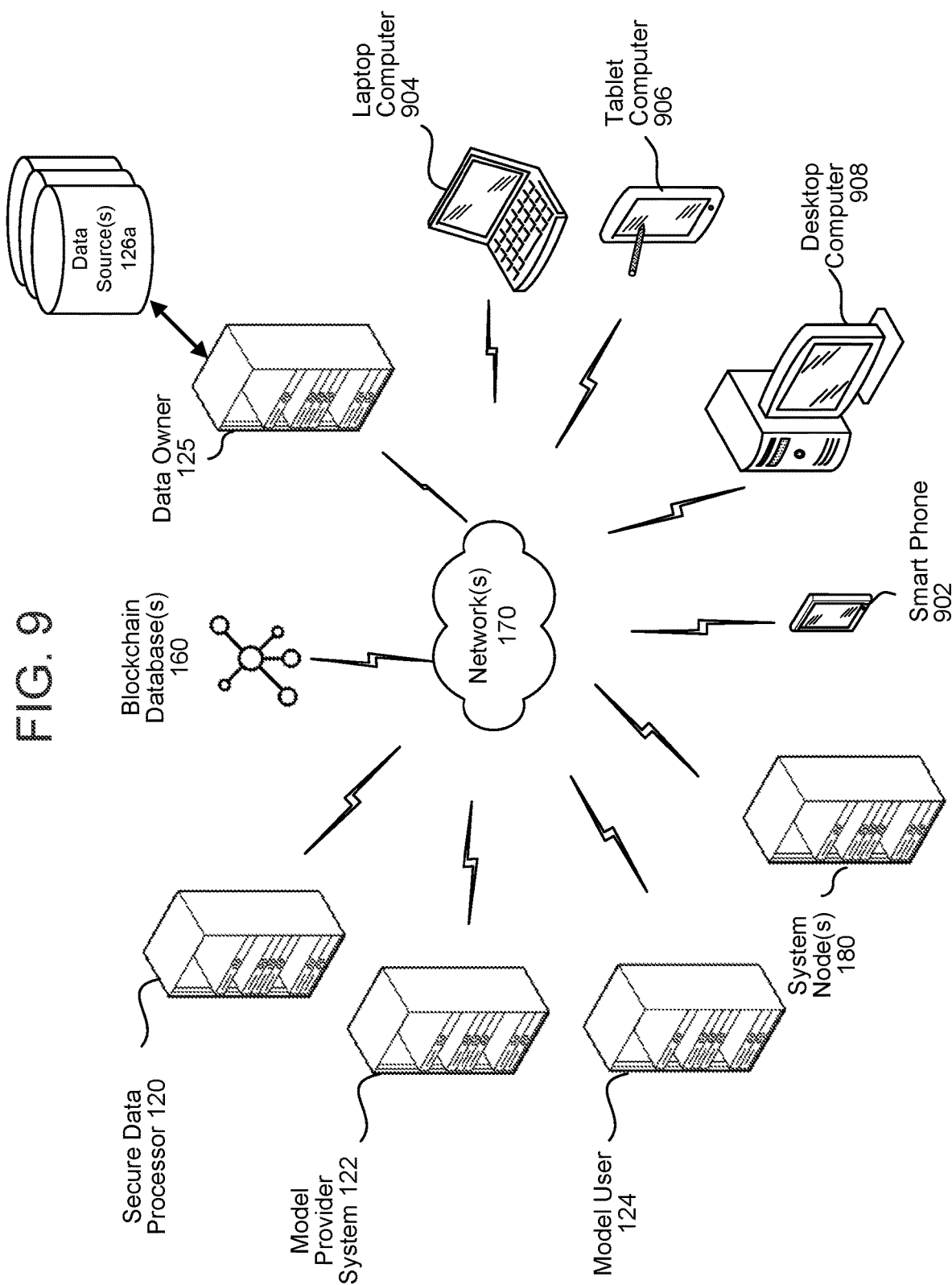
FIG. 9 illustrates a network according to embodiments of the present disclosure.

FIG. 9 illustrates a number of devices in communication with the secure data processor system 120, the model user system 124, the model provider system 122, the data owner 125, and/or the system node(s) 180 using the network 170. The devices may include a smart phone 902, a laptop computer 904, a tablet computer 906, and/or a desktop computer 908. Such devices may be examples of, for example, template author device 150, algorithm provider device 402, or other devices used by parties to a verified template or smart contract, etc. These devices may be used to remotely access the data owner 125, the model system provider 122, the model user system 124, and/or, through such components, the secure data processor system 120, to perform any of the operations described herein.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and data processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A system comprising:
   at least one processor; and
   at least one memory including instructions that, when executed by the at least one processor, cause the system to:
   determine verified template data including at least a portion of executable computer instructions;
   cause the verified template data to be stored with a blockchain;

receive, from the blockchain, identifier data indicating the verified template data as stored with the blockchain;

receive, from a first system, a first request to validate the executable computer instructions for operation by at least one system other than the first system;

send, by a second system and to at least one device associated with the blockchain, a second request to obtain first data corresponding to the executable computer instructions, wherein the first data corresponds to an agreement between at least a first party and a second party regarding the executable computer instructions and wherein the second request includes the identifier data;

receive, by the second system, the first data;

determine the executable computer instructions are permitted to be executed by the at least one system other than the first system; and cause the executable computer instructions to be executed, wherein execution of the executable computer instructions results in operating an algorithm associated with the first party on data associated with the second party.

2. The system of claim 1, wherein the first data includes first hash data and wherein the instructions that cause the system to determine the executable computer instructions are permitted to be executed by the at least one system other than the first system include instructions, that, when executed by the at least one processor, further cause the system to:

determine second hash data representing a verified template including at least a portion of the executable computer instructions; and compare the first hash data with the second hash data to determine at least a first portion of the first data corresponds to at least a first portion of the verified template.

3. The system of claim 1, wherein the at least one memory further includes instructions, that, when executed by the at least one processor, further cause the system to:

send, to a second device associated with the second party, a third request to determine the executable computer instructions are appropriate for operation with respect to the first data; and receive, from the second device, an indication that the executable computer instructions are appropriate for operation with respect to the first data.

4. The system of claim 3, wherein the at least one memory further includes instructions, that, when executed by the at least one processor, further cause the system to:

send, by the second device to the at least one device associated with the blockchain a request for contract data corresponding to the executable computer instructions; and process, by the second device, the contract data to determine that the executable computer instructions are appropriate for operation with respect to the first data.

5. The system of claim 1, wherein the at least one memory further includes instructions, that, when executed by the at least one processor, further cause the system to:

receive, from the first system, at least one value corresponding to a parameter of the executable computer instructions, wherein the instructions that cause the system to process at least a portion of the executable computer instructions to determine the executable computer instructions are permitted to be executed using the at least one value.

6. The system of claim 1, wherein the at least one memory further includes instructions, that, when executed by the at least one processor, further cause the system to:

determine verified template data including at least a portion of the executable computer instructions;

receive at least one value to be used with execution of the executable computer instructions; and determine filled template data including the executable computer instructions and the at least one value, wherein the first data corresponds to the filled template data.

7. The system of claim 1, wherein the at least one memory further includes instructions, that, when executed by the at least one processor, further cause the system to:

determine, using the first data, a constraint associated with the executable computer instructions; and prior to causing the executable computer instructions to be executed, determine the constraint is satisfied.

8. The system of claim 1, wherein the instructions that cause the system to determine the executable computer instructions are permitted to be executed by the at least one system other than the first system comprise instructions, that, when executed by the at least one processor, further cause the system to:

cause the executable computer instructions to be executed using test data.

9. The system of claim 1, wherein the at least one memory further includes instructions, that, when executed by the at least one processor, further cause the system to:

determine an identifier associated with the first system is associated with the first data.

10. A computer-implemented method comprising:

receiving, from a first system, a first request to validate executable computer instructions for operation by at least one system other than the first system;

sending, by a second system and to at least one device associated with a blockchain, a second request to obtain first data corresponding to the executable computer instructions, wherein the first data corresponds to an agreement between at least a first party and a second party regarding the executable computer instructions;

receiving, by the second system, the first data;

sending, to a second device associated with the second party, a third request to determine the executable computer instructions are appropriate for operation with respect to the first data;

receiving, from the second device, an indication that the executable computer instructions are appropriate for operation with respect to the first data; and causing the executable computer instructions to be executed, wherein execution of the executable computer instructions results in operating an algorithm associated with the first party on data associated with the second party.

11. The computer-implemented method of claim 10, further comprising, prior to receiving the first request:

determining verified template data including at least a portion of the executable computer instructions;

causing the verified template data to be stored with the blockchain; and receiving, from the blockchain, identifier data indicating the verified template data as stored with the blockchain, wherein the second request includes the identifier data.

12. The computer-implemented method of claim 10, wherein the first data includes first hash data and wherein determining the executable computer instructions are permitted to be executed by the at least one system other than the first system comprises:

determining second hash data representing a verified template including at least a portion of the executable computer instructions; and comparing the first hash data with the second hash data to determine at least a first portion of the first data corresponds to at least a first portion of the verified template.

13. The computer-implemented method of claim 10 further comprising:

sending, by the second device to the at least one device associated with the blockchain a request for contract data corresponding to the executable computer instructions; and processing, by the second device, the contract data to determine that the executable computer instructions are appropriate for operation with respect to the first data.

14. The computer-implemented method of claim 10, further comprising:

receiving, from the first system, at least one value corresponding to a parameter of the executable computer instructions, wherein determining the executable computer instructions are permitted to be executed by the at least one system other than the first system comprises using the at least one value.

15. The computer-implemented method of claim 10, further comprising:

determining verified template data including at least a portion of the executable computer instructions;

receiving at least one value to be used with execution of the executable computer instructions; and determining filled template data including the executable computer instructions and the at least one value, wherein the first data corresponds to the filled template data.

16. The computer-implemented method of claim 10, further comprising:

determining, using the first data, a constraint associated with the executable computer instructions; and prior to causing the executable computer instructions to be executed, determining the constraint is satisfied.

17. The computer-implemented method of claim 10, further comprising:

causing the executable computer instructions to be executed using test data.

18. The computer-implemented method of claim 10, further comprising:

determining an identifier associated with the first system is associated with the first data.

* * * * *